United States Patent [19]

McCain et al.

[11] Patent Number: 4,535,112
[45] Date of Patent: Aug. 13, 1985

[54] CATION EXCHANGE ELECTROLYTIC CELL MEMBRANES AND METHOD FOR MAKING AND REPAIRING

[75] Inventors: G. Howard McCain, Painesville; Leo L. Benezra, Mentor; Craig E. Finch, Chagrin Falls, all of Ohio

[73] Assignee: Eltech Systems Corporation, Boca Raton, Fla.

[21] Appl. No.: 534,375

[22] Filed: Sep. 21, 1983

Related U.S. Application Data

[63] Continuation of Ser. No. 318,967, Nov. 6, 1981, abandoned.

[51] Int. Cl.$^3$ .................................................. C08J 5/22
[52] U.S. Cl. ..................................... 524/233; 521/27; 524/288; 524/236; 524/319; 524/341; 524/462

[58] Field of Search ............... 524/233, 288, 319, 236, 524/341, 462

[56] References Cited

FOREIGN PATENT DOCUMENTS 2014585 2/1978 United Kingdom .

Primary Examiner—Paul R. Michl
Attorney, Agent, or Firm—Arthur S. Collins

[57] ABSTRACT

A method for repairing perfluorocarbon copolymeric cation exchange membranes. A quantity of a perfluorocarbon copolymer having a desired pendant cation exchange functional group is partially solvated in a solvating dispersion media, applied to areas of the membrane to be repaired, and the dispersion media removed.

7 Claims, No Drawings

CATION EXCHANGE ELECTROLYTIC CELL MEMBRANES AND METHOD FOR MAKING AND REPAIRING

This application is a continuation of application Ser. No. 318,967, filed Nov. 6, 1981, abandoned.

TECHNICAL FIELD

The present invention relates to electrolytic cells and particularly to electrolytic halogen generating cells in which a cation exchange membrane separates the anode and cathode within the electrolytic cell. Specifically this invention relates to methods for making and for repairing these cation exchange membranes.

BACKGROUND OF THE INVENTION

The use of a separator between an anode and cathode in batteries, fuel cells, and electrochemical cells is known. In the past, these separators have been generally porous separators, such as asbestos diaphragms, used to separate reacting chemistry within the cell. Particularly, for example, in diaphragm chlorine generating cells, such a separator functions to restrain back migration of $OH^-$ radicals from a cell compartment containing the cathode to a cell compartment containing the anode. A restriction upon $OH^-$ back migration has been found to significantly decrease overall electric current utilization inefficiencies in operation of the cells associated with a reaction of the $OH^-$ radical at the anode releasing oxygen.

More recently separators based upon an ion exchange copolymer have found increasing application in batteries, fuel cells, and electrochemical cells. One copolymeric ion exchange material finding particular acceptance in electrochemical cells such as chlorine generation cells has been fluorocarbon vinyl ether copolymers known generally as perfluorocarbons and marketed by E. I. duPont under the name Nafion ®.

These so-called perfluorocarbons are generally copolymers of two monomers with one monomer being selected from a group including vinyl fluoride, hexafluoropropylene, vinylidene fluoride, trifluoroethylene, chlorotrifluoroethylene, perfluoro(alkylvinyl ether), tetrafluoroethylene and mixtures thereof.

The second monomer is selected from a group of monomers usually containing an $SO_2F$ or sulfonyl fluoride group or a COF or carbonyl fluoride group. Examples of such second monomers can be generically represented by the formula $CF_2=CFR_1SO_2F$ and $CF_2=CFR_1COF$. $R_1$ in the generic formula is a bifunctional perfluorinated radical comprising 1 to 8 carbon atoms but occasionally as many as 25 carbon atoms. One restraint upon the generic formula is a general requirement for the presence of at least one fluorine atom on the carbon atom adjacent the $-SO_2F$ or COF, particularly where the functional group exists as the $-(SO_2NH)_mQ$ form. In this form, Q can be hydrogen or an alkali or alkaline earth metal cation and m is the valence of Q. The $R_1$ generic formula portion can be of any suitable or conventional configuration, but it has been found preferably that the vinyl radical comonomer join the $R_1$ group through an ether linkage.

Typical sulfonyl fluoride containing monomers are set forth in U.S. Pat. Nos. 3,282,875; 3,041,317; 3,560,568; 3,718,627 and methods of preparation of intermediate perfluorocarbon copolymers are set forth in U.S. Pat. Nos. 3,041,317; 2,393,967; 2,559,752 and 2,593,583. These perfluorocarbons generally have pendant $SO_2F$ based functional groups.

Chlorine cells equipped with separators fabricated from perfluorocarbon copolymers have been utilized to produce a somewhat concentrated caustic product containing quite low residual salt levels. Perfluorocarbon copolymers containing perfluoro(3,6-dioxa-4-methyl-7-octenesulfonyl fluoride) comonomer have found particular acceptance in $Cl_2$ cells.

In chlorine cells using a sodium chloride brine feedstock, one drawback to the use of perfluorocarbon separators having pendant sulfonyl fluoride based functional groups has been a relatively low resistance in desirably thin separators to back migration of caustic including $OH^-$ radicals from the cathode to the anode compartment. This back migration contributes to a lower current utilization efficiency in operating the cell since the $OH^-$ radicals react at the anode to produce by-products. Recently, it has been found that if pendant sulfonyl fluoride based cationic exchange groups adjacent one separator surface were converted to pendant carboxylate groups, the back migration of $OH^-$ radicals in such $Cl_2$ cells would be significantly reduced. Conversion of sulfonyl fluoride groups to carboxylate groups is discussed in U.S. Pat. No. 4,151,053.

Presently, perfluorocarbon separators are generally fabricated by forming a thin membrane-like sheet under heat and pressure from one of the intermediate copolymers previously described. The ionic exchange capability of the copolymeric membrane is then activated by saponification with a suitable or conventional compound such as a strong caustic.

Generally, such membranes are between 0.5 mil and 150 mil in thickness. Reinforced perfluorocarbon membranes have been fabricated, for example, as shown in U.S. Pat. No. 3,925,135.

Being thin, these membranes, while strongly resistant to the chemical environment within the electrolytic cell, are often subject to physical damage: tears, punctures and flex fatigue cracking. One past proposal has been to repair this physical damage using low equivalent weight copolymer solvated with an alcohol. Such repaired areas have not offered desirable membrane performance characteristics normally associated with higher density copolymeric material, and overall performance of the membrane has declined. These repairs often have achieved less than desirable adhesion to the membrane since mechanical bonding not solvent molding is a significant factor in adhesion.

The use of alcohols to solvate particularly low equivalent weight perfluorocarbon copolymers is known. However, as yet, proposals for formation of perfluorocarbon composite electrodes and for solvent welding the composites to perfluorocarbon membranes where the perfluorocarbons are of relatively elevated equivalent weights desirable in, for example, chlorine cells, have not proven satisfactory. Dissatisfaction has been at least partly due to a lack of suitable techniques for dispersing or solvating in part these higher equivalent weight perfluorocarbons.

In another proposal, heat and pressure have been utilized to adhere a patch of the higher density copolymeric material to the damaged membrane portion. These repairs have met with limited success since heat necessary to fuse reliably the patch to the damaged area can impair cation exchange functionality of the copolymeric material.

DISCLOSURE OF THE INVENTION

The present invention provides a method and compound for the repair of perfluorocarbon copolymeric electrolytic cell membranes having a relatively elevated equivalent weight. Using the method of the instant invention, a perfluorocarbon copolymeric material having a particular equivlanet weight and particular pendant functional groups can be repaired using copolymeric material having identical equivalent weight and pendant functionality.

In the method, the elevated equivalent weight copolymeric perfluorocarbon comprising the membrane includes pendant functional groups based upon either carbonyl or sulfonyl functional groups. Defects in the membrane are repaired by patching with a dispersion of a selected patching perflurocarbon copolymer and a media capable of at least partially solvating both the patching perfluorocarbon and the membrane perfluorocarbon.

The dispersion is applied to the membrane, covering any defects, and the dispersion media is removed. Removal can be accomplished using heat and/or vacuum. Alternate application of the dispersion and subsequent removal of the dispersion media is continued until a layer of desired thickness is built up upon the portion of the membrane being repaired.

In preferred embodiments, the dispersion is applied at a relatively elevated temperature; however, $RSO_3Li$ patching dispersions are desirably applied at temperatures at or somewhat above room temperature. From time to time, it may be desirable to embed a fabric mesh in the dispersion being applied to a membrane under repair. The mesh adds strength to repairs made to the membrane. The solvating dispersion media is preferably removed at relatively elevated temperatures.

Using the method of the instant invention, membrane perfluorocarbon having a particular pendant functional group can be repaired using a perfluorocarbon having the same or different pendant functional groups so long as both perfluorocarbons are soluble in the dispersion media. The equivalent weight of the copolymeric perfluorocarbons can be the same, or different, but are generally of a relatively elevated equivalent weight to avoid possible damage by aggressive chemicals within the electrolytic cell.

The above and other features and advantages of the invention will become more evident when considered in conjunction with a detailed description of the invention that follows.

BEST EMBODIMENT OF THE INVENTION

The present invention provides a method for repairing physical damage, tears, punctures, flex fatigue and the like in a copolymeric perfluorocarbon membrane. Typically, as in this best embodiment, these membranes can be used in fuel cells, batteries and electrolytic cells as separators between anode and cathode portions of the cell. Typically the membrane perfluorocarbon includes functional groups that impart, generally, cation exchange properties to the membrane. Typically perfluorocarbon is available in sheet form having particular functional groups capable of impairing cation exchange; alternatively, the perfluorocarbon is available in a so-called intermediate form having generally functional groups relatively readily converted to functional groups capable of impairing cation exchange properties to the perfluorocarbon.

The intermediate polymer is prepared from at least two monomers that include fluorine substituted sites. At least one of the monomers comes from a group that comprises vinyl fluoride, hexafluoropropylene, vinylidene fluoride, trifluoroethylene, chlorotrifluoroethylene, perfluoro(alkyl vinyl ether), tetrafluoroethylene and mixtures thereof.

At least one of the monomers comes from a grouping having members with functional groups capable of imparting cationic exchange characteristics to the final copolymer. Monomers containing pendant sulfonyl, carbonyl or, in some cases phosphoric acid based functional groups are typical examples. Condensation esters, amides or salts based upon the same functional groups can also be utilized. Additionally, these second group monomers can include a functional group into which an ion exchange group can be readily introduced and would thereby include oxyacids, salts, or condensation esters of carbon, nitrogen, silicon, phosphorus, sulfur, chlorine, arsenic, selenium, or tellurium.

Among the preferred families of monomers in the second grouping are sulfonyl and carbonyl containing monomers containing the precursor functional groups $SO_2F$ or $SO_3$ alkyl, $COF$ or $CO_2$ alkyl. Examples of members of such a family can be represented by the generic formula of $CF_2=CFSO_2F$ and $CF_2=CFR_1SO_2F$ where $R_1$ is a bifunctional perfluorinated radical comprising usually 2 to 8 carbon atoms but reaching 25 carbon atoms upon occasion.

The particular chemical content or structure of the perfluorinated radical linking the sulfonyl group to the copolymer chain is not critical and may have fluorine, chlorine or hydrogen atoms attached to the carbon atom to which the sulfonyl or carbonyl based group is attached, although the carbon atom to which the sulfonyl or carbonyl based group is attached must also have at least one fluorine atom attached. Preferably the monomers are perfluorinated. If the functional group is attached directly to the chain, the carbon in the chain to which it is attached must have a fluorine atom attached to it. The $R_1$ radical of the formula above can be either branched or unbranched, i.e., straight chained, and can have one or more either linkages. It is preferred that the vinyl radical in this group of sulfonyl or carbonyl fluoride containing comonomers be joined to the $R_1$ group through an ether linkage, i.e., that the comonomer be of the formula $CF_2=CFOR_1X$ where X is $COF$ or $SO_2F$. Illustrative of such sulfonyl fluoride containing comonomers are:

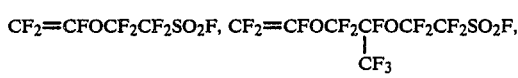

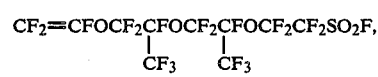

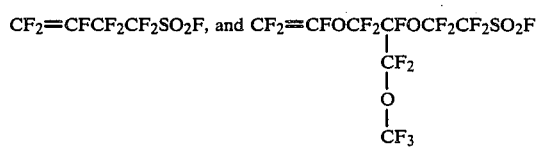

The corresponding esters of the aforementioned sulfonyl and carbonyl fluorides are equally preferred.

While the preferred intermediate copolymers are perfluorocarbon, that is perfluorinated, others can be utilized where there is a fluorine atom attached to the carbon atom to which the sulfonyl or carbonyl group is attached. A highly preferred copolymer is one of tetrafluoroethylene and perfluoro(3,6-dioxa-4-methyl-7-octenesulfonyl fluoride) comprising between 10 and 60 weight percent, and preferably between 25 and 40 weight percent, of the latter monomers.

These perfluorinated copolymers may be prepared in any of a number of well-known manners such as is shown and described in U.S. Pat. Nos. 3,041,317; 2,393,967; 2,559,752 and 2,593,583.

An intermediate copolymer is readily transformed into a copolymer containing ion exchange sites by conversion of the sulfonyl or carbonyl groups ($-SO_2F$ or $-SO_3$ alkyl and COF or $CO_2$ alkyl) to the form $-SO_3Z$ or $CO_2Z$ by saponification or the like wherein Z is hydrogen, an alkali metal, an amine, an ammonium ion or salt, or an alkaline earth metal. The converted copolymer contains sulfonyl or carbonyl group based ion exchange sites contained in side chains of the copolymer and attached to carbon atoms having at least one attached fluorine atom. Not all sulfonyl or carbonyl groups within the intermediate copolymer need be converted. The conversion may be accomplished in any suitable or customary manner such as is shown in U.S. Pat. Nos. 3,770,547 and 3,784,399.

A separator made from copolymeric perfluorocarbon having sulfonyl based cation exchange functional groups possesses a relatively low resistance to back migration of sodium hydroxide from the cathode to the anode, although such a membrane successfully resists back migration of other caustic compounds such as KOH. Certain membrane configurations utilize adjacent layers of perfluorocarbon, one layer having pendant carbonyl derived functionality and the other layer having pendant sulfonyl derived functionality. The carbonyl derived layer of functionality provides additional resistance to back migration but also provides additional resistance to desired cation migration. The layering with perfluorocarbon having sulfonyl derived pendant functionality allows the carbonyl layer to be fabricated to be desirably thin, resisting back migration, but only marginally interfering with desired cation movement without sacrificing structured membrane strength.

In one preferred embodiment, the sulfonyl derived zone alternately can contain perfluorocarbon containing pendant functional groups can be sulfonamide functionality of the form $-R_1SO_2NHR_2$ where $R_2$ can be hydrogen, alkyl, substituted alkyl, aromatic or cyclic hydrocarbon or a metal ion. Methods for providing sulfonamide based ion exchange membranes are shown in U.S. Pat. Nos. 3,969,285 and 4,113,585.

Copolymeric perfluorocarbon having pendant carboxylate cationic exchange functional groups can be prepared in any suitable or conventional manner such as in accordance with U.S. Pat. No. 4,151,053 or Japanese Patent Application 52(1977)38486 or polymerized from a carbonyl functional group containing monomer derived from a sulfonyl group containing monomer by a method such as is shown in U.S. Pat. No. 4,151,053. Preferred carbonyl containing monomers include $CF_2=CF-O-CF_2CF(CF_3)O(CF_2)_2COOCH_3$ and $CF_2=CF-O-CF_2CF(CF_3)OCF_2COOCH_3$.

Preferred copolymeric perfluorocarbons utilized in the instant invention therefore include carbonyl and/or sulfonyl based groups represented by the formula $-OCF_2CF_2X$ and/or $-OCF_2CF_2Y-O-YCF_2CF_2O-$ wherein X is sulfonyl fluoride ($SO_2F$) carbonyl fluoride (COF) sulfonate methyl ester ($SO_2OCH_3$) carboxylate methyl ester ($COOCH_3$) sulfonamides of the general form ($R_1SO_2NHR_2$) ionic carboxylate ($COO^-Z^+$) or ionic sulfonate ($SO_3^-Z^+$), Y is sulfonyl or carbonyl ($-SO_2-$, $-CO-$) and Z is hydrogen, an alkali metal such as lithium, cesium, rubidium, potassium and sodium, an alkaline earth metal such as beryllium, magnesium, calcium, strontium, barium and radium, an amine or an ammonium ion or salt.

Generally, sulfonyl, carbonyl, sulfonate and carboxylate esters and sulfonyl and carbonyl based amide forms of the perfluorocarbon copolymer are readily converted to a salt form by treatment with a strong alkali such as NaOH.

A membrane can be formed by any suitable or conventional means such as by extrusion, calendering, solution coating or the like. It may be advantageous to employ a reinforcing framework within the copolymeric material. This framework can be of any suitable or conventional nature such as TEFLON mesh or the like. Layers of copolymer containing differing pendant functional groups can be laminated under heat and pressure in well-known processes to produce a membrane having desired functional group properties at each membrane surface and throughout each laminate. For chlorine generation cells, such membranes have a thickness generally of between 1 mil and 150 mils with a preferable range of from 4 mils to 10 mils.

The equivalent weight range of the copolymer intermediate used in preparing the membrane is important. Where lower equivalent weight intermediate copolymers are utilized, the membrane can be subject to destructive attack such as dissolution by cell chemistry. When an excessively elevated equivalent weight copolymer intermediate is utilized, the membrane may not pass cations sufficiently readily, resulting in an unacceptably high electrical resistance in operating the cell. It has been found that copolymer intermediate equivalent weights should preferably range between about 1000 and 1500 for the sulfonyl based membrane materials and between about 900 and 1500 for the carbonyl based membrane materials. These same considerations find application in the selection of a patching perfluorocarbon to be used in implementing the repair method of the instant invention.

Perfluorocarbon copolymer is dispersed to form a patching or repairing compound in any suitable or conventional manner. Preferably relatively finely divided particles of the copolymer are used to form the dispersion. The particles are dispersed in a dispersion medium that preferably has significant capability for solvating the elevated equivalent weight perfluorocarbon copolymer particles. A variety of solvents have been discovered for use as a dispersion medium for the perfluorocarbon copolymer; these suitable solvents are tabulated in Table I and coordinated with the copolymer pendant functional groups with which they have been found to be an effective dispersion medium. Since these dispersing solvents function effectively alone, in mixtures of more than one or with diluents, the term dispersion media is used to indicate a suitable or conventional solvating dispersing agent including at least one solvating medium.

TABLE I

SOLVENT DISPERSION MEDIA CROSS REFERENCE TO PERFLUOROCARBON COPOLYMER CONTAINING VARIOUS PENDANT FUNCTIONAL GROUPS

| SOLVENTING DISPERSION MEDIUM | $SO_2F$ | $SO_3$(ester)* | $COO^-Z^+$ | COO(ester)* | $SO_3^-Z^+$ |
|---|---|---|---|---|---|
| Halocarbon Oil | X | X | | X | |
| perfluorooctanoic acid | X | X | | X | |
| perfluorodecanoic acid | X | X | | X | |
| perfluorotributylamine | X | X | | | |
| FC-70 available from 3M (perfluorotrialkylamine) | X | X | | | |
| perfluoro-1-methyldecalin | X | X | | | |
| decafluorobiphenyl | X | X | | | |
| pentafluorophenol | X | X | | | |
| pentafluorobenzoic acid | X | X | | | |
| N—butylacetamide | | | X | | X |
| tetrahydrothiophene-1,1-dioxide (tetramethylene sulfone, Sulfolane ®) | | | | | X |
| N,N—dimethyl acetamide | | | | | X |
| N,N—diethyl acetamide | | | | | X |
| N,N—dimethyl propionamide | | | | | X |
| N,N—dibutylformamide | | | | | X |
| N,N—dipropylacetamide | | | | | X |
| N,N—dimethyl formamide | | | | | X |
| 1-methyl-2-pyrrolidinone | | | | | X |
| diethylene glycol | | | | | X |
| ethylacetamidoacetate | | | | | X |
| 1-cyclohexyl-2-pyrrolidinone | | | | | X |
| glycerine | | | | | X |
| 2-ethylhexyl-di-phenylphosphate | | | | | X |

Z is any alkali or alkaline earth metal or a quaternary ammonium ion having attached hydrogen, alkyl, substituted alkyl, aromatic, or cyclic hydrocarbon. Halocarbon Oil is a commerically marketed oligomer of chlorotrifluoroethylene.
*Lower alkyl.

Certain of the solvating dispersion media function more effectively with perfluorocarbon having particular metal ions associated with the functional group. For example, N-butylacetamide functions well with the groups COOLi and $(SO_3)_2Ca$. Sulfolane and N,N-dipropylacetamide function well with $SO_3$ Na functionality.

It is believed that other suitable or conventional perhalogenated compounds can be used for at least partially solvating $SO_2F$ or carboxylate ester forms of perfluorocarbon copolymer. It is believed that other suitable or conventional strongly polar compounds can be used for solvating the ionic sulfonate and carboxylate form of perfluorocarbon copolymer.

In dispersing by at least partially solvating the perfluorocarbon polymers in preparing the patching compound, it is frequently found necessary to heat a blend of the dispersion media and the relatively finely divided perfluorocarbon to a temperature between about 50° C. and 280° C., but not in excess of the boiling point for the resulting dispersion. Typically this temperature is in excess of 125° C.

Depending upon the solvating dispersion media, a solution of between about 5 and 25 weight percent results. It is not necessary that the perfluorocarbon be dissolved completely in order to form a suitable patching compound. One preferred technique comprises heating the dispersion to at least approach complete solvation and then cooling the dispersion to form a gelatinous dispersion having particles of approximately a desired size. The cooled temperature will vary with the solvent selected. The particle size is controllable using either of mechanical or ultrasonic disruption of the gelatinous dispersion.

Referring to Table I, it may be seen that various solvents have a particularly favorable effect upon only perfluorocarbon copolymers having certain functional groups. Where a perfluorocarbon having functional groups of a first type is layered to a perfluorocarbon having functional groups of a second type in fabricating a membrane, separate patching materials may be required for repairing each layer. Alternately it may be desirable to alter pendant functional groups to achieve solvent compatibility. Particularly hydrolysis and substitution of metal ions ionically bonded to the functional group can provide a relatively simple tool for coordinating functional groups and solvents. However, other methods such as the use of $SF_4$ to reform sulfonyl fluoride functional groups from derivatives of sulfonyl fluoride are also available.

In implementing the repair method of the instant invention, it is important that the solvating dispersion media used for dispersing the patching perfluorocarbon also possess substantial solvating propensity for the perfluorocarbon material being repaired. The membrane is supported in any convenient manner whereby the dispersed patching compound can be applied over the membrane area being repaired. Solvating dispersion media at least partially solvates the membrane being repaired so that when the dispersion media is removed, the patching perfluorocarbon and the membrane perfluorocarbon being repaired become coadhered. A strong bonded patch thereby results upon the membrane.

Removal of the dispersion media can be accomplished using a heat of between ambient temperature and about 250° C. and/or a vacuum. Heat of about 160° C. or more offers the added advantage of enhancing solvent related coadherence between the patching perfluorocarbon and the membrane. Any suitable heating source, such as infra-red, heated air, or a heated, relatively nonstick surface, can be used for applying heat.

Pressure, up to about 4000 pounds per square inch (psi), but generally between zero and about 1000 psi, can be used to enhance coadherence between the patch and the membrane. Whether pressure is necessary is, to a large extent, dependent upon the degree to which the patching perfluorocarbon and the membrane perfluorocarbon are soluble in the dispersion media, and the temperature at which patching dispersion is applied and solvating dispersion media is removed.

The thickness of any patch or repair applied using the method of the instant invention is somewhat dependent upon the quantity of patching material applied per unit area of the membrane being repaired. Excessively thick patches may spall or delaminate during removal of the dispersion media and may present an unacceptably elevated resistance to cation migration by virtue of thickness. Repairs insufficiently thick may rupture or tear when installed in an electrochemical cell. A good guideline for determining repair thickness is that the patch material should be between about ½ and 3 times the thickness of the membrane, the actual preferred thickness being at least, in part, a function of the particular perfluorocarbons. Where patches on the order of more than a few mils are to be applied, application is preferably accomplished by more than one cycle of application of the dispersion and removal of the solvent, resulting in a layered patch.

Where the repaired membrane is to be subjected to a stressful physical environment in use, it may be desirable to reinforce the patching perfluorocarbon. Reinforcement can be accomplished by embedding a suitable or conventional reinforcing structure such as a fabric mesh or a screening in one or more layers of the patching compound being applied. TEFLON (a duPont product, tetrafluoroethylene polymer) mesh is particularly suitable where the membrane is used in an electrochemical cell such as a chloralkali cell. Any such reinforcing structure should be embedded in patching perfluorocarbon for a distance surrounding patch areas requiring reinforcement to assure a firm anchor with the membrane.

Patching perfluorocarbon dispersion can be applied in any suitable or conventional manner such as by the use of painting, spraying, troweling and the like. With mechanical applicators, care is required to avoid additional mechanical damage to the membrane being repaired.

EXAMPLE I

N-butylacetamide and about 14 percent by weight of a 950 gram equivalent weight copolymeric perfluorocarbon having pendant $COO^-Li^+$ functional groups were blended at approximately 200° C. The resulting solution was clear. When cooled to room temperature, the dispersion, while remaining clear, became quite viscous. Where 5 percent by weight of the perfluorocarbon is added to the N-butylacetamide dispersion media and heated to 100° C., subsequent cooling to room temperature results in a clear, freely flowing gelatinous dispersion.

EXAMPLE II

Three 4-inch by 4-inch squares were cut from a perfluorocarbon membrane comprising two laminated layers. One layer was a 5-mil thickness of an 1100 equivalent weight perfluorocarbon copolymer having pendant sulfonic acid groups ($SO_3^-H^+$). The other layer was a 2-mil thickness of a 1050 equivalent weight perfluorocarbon copolymer having pendant carboxylate functional groups ($CO_2^-H^+$). Two of the squares were each punctured thrice using a 22 gauge (0.025-inch diameter) hypodermic needle.

2.3 grams of a powdered 1100 equivalent weight perfluorocarbon copolymer having pendant lithium sulfonate functional groups (marketed by E. I. duPont under the name Nation ®, catalyst grade) was dissolved in 20.7 grams of an 80/20 weight percent mixture of sulfolane and N-butylacetamide, respectively. Dissolution was accomplished by stirred heating to 230° C. The solution was then cooled to room temperature to yield a moderately viscous gelatinous dispersion.

One of the pierced membrane squares was contacted for 16 hours at 60° C. with a 3 weight percent solution of LiOH to convert pendant functional sites to the form $SO_3^-Z^+$ and $CO_2^-Z^+$ where $Z^+$ was $Li^+$. The square was rinsed in warm water to remove residual LiOH and then dried at room temperature. Three drops of the gelatinous dispersion were applied to each of the punctures at the sulfonic layer membrane surface. The drops were allowed to rest for 30 minutes to permit solvating interaction with the membrane layer, and then the square was heated at 200° C. for 30 minutes to remove the sulfolane and N-butylacetamide. Dispersion application was repeated twice more in identical fashion.

The repaired membrane, the unpunctured membrane and the unrepaired punctured membrane were each installed in identical electrochemical cells generating chlorine from a sodium chloride brine fed to the anode compartment of each cell. The cells were operated at 85° C. and between 2 and 3 amperes per square inch of membrane surface. The repaired membrane cell and the unpunctured membrane cell each produced approximately 450 grams per liter caustic from the cell cathode compartment containing approximately 0.34 gram per liter NaCl. The cell containing the unpunctured membrane operated at 94.7 percent current efficiency; the cell using the repaired membrane operated at about a 92.7 percent current efficiency. The cell containing the unrepaired punctured membrane produced 288 grams per liter caustic from the cathode compartment containing 127 grams per liter NaCl at a 77 percent current efficiency. Given the small scale of the cells, performance of the cells using the unpunctured and repaired membranes are effectively equal.

EXAMPLE III

The repair of Example II is repeated except using a dispersion media blend comprising an 80/20 weight percent blend of N-butylacetamide and sulfolane, respectively. The punctures are repaired at the carboxylic layer surface in lieu of the sulfonate layer surface. Substantially identical results are obtained when this repaired membrane square repaired from the carboxylate surface is utilized in an electrolytic cell. Performance differences between the repaired membrane and an unpunctured membrane are nondistinguishable within the parameters of the laboratory scale cell system.

EXAMPLE IV

A 5 weight percent solution of the catalyst grade perfluorocarbon copolymer of Example II in N,N-dibutylformamide was prepared by heating the copolymer and the dispersion media to 200° C. with stirring. The resulting solution was cooled to 150° C., cooling to room temperature creating a highly viscous gelatinous compound difficult to work with. The dispersion at 150° C. was dropped onto a punctured membrane identical with those of Example II at the rate of 4 drops per puncture. The drops rested on the punctured area for 30 minutes after which the membrane square was heated at 230° C. for 30 minutes to remove the N,N-dibutylformamide. Four additional applications of the dispersed patching perfluorocarbon were made, compensating at least in part for the more dilute patching solution being utilized. The membrane, repaired from the sulfonic acid layer surface, was installed in an electrolytic chlorine generating cell identical to the cells used in Example II, producing 450 grams per liter caustic having 0.34 gram per liter NaCl at a 93.0 percent current efficiency.

While a preferred embodiment of the invention has been shown and described in detail, it should be apparent that the various alterations or modifications can be made without departing from the scope of the claims following.

What is claimed is:

1. A patching compound for use in repairing an electrolytic cell membrane made from a perfluorocarbon copolymer formed by copolymerization of at least one fluorinated vinyl monomer and at least one monomer having a structure corresponding to $CF_2=CFX$, $CF_2CFR_1X$ or $CF_2=CFOR_1X$ wherein $R_1$ is a bifunctional perfluorinated group containing at least 2 to 8 carbon atoms, and X is a pendant functional group selected from sulphonyl fluoride, carbonyl fluoride, sulphonate esters, carboxylate esters, sulphonamides and metal, ammonium or amine salts of sulphonate or carboxylate functional groups said copolymer having an equivalent weight of between 1000 and 1500 in the intermediate sulphonyl fluoride form whenever said functional groups are predominantly sulphonyl types and between 900 and 1500 in the intermediate carbonyl fluoride form whenever said functional groups are predominantly carbonyl types, comprising a dispersion of (a) about 5 to 25 weight percent of a patching perfluorocarbon copolymer meeting the specifications just given hereinabove for the aforesaid membrane copolymer in (b) a dispersion medium capable of at least partially solvating both of said perfluorocarbon copolymers, and, when said functional groups are predominantly sulphonyl types, said dispersion medium is selected from the group consisting of halocarbon oil, perfluorooctanoic acid, perfluorodecanoic acid, perfluorotributylamine, perfluorotrialkylamine, perfluoro-1-methyldecalin, decafluorobiphenyl, pentafluorophenol, pentafluorobenzoic acid, N-butylacetamide, tetrahydrothiophene-1,1-dioxide, N,N-diethyl acetamide, N,N-dipropylacetamide, N,N-dimethylformamide, 1-methyl-2-pyrrolidinone, diethyl glycol, ethylacetamidoacetate, 1cyclohexyl-2-pyrrolidinone, glycerine, ethyl-hexyl-diphenylphosphate, and mixtures thereof, whereas when said functional groups are predominantly carbonyl types, said dispersion medium is selected from halocarbon oil, perfluorooctanoic acid, perfluorodecanoic acid, N-butylacetamide and mixtures thereof.

2. The patching compound of claim 1 wherein the predominantly functional groups in both the membrane copolymer and the patching copolymer are sulphonyl types.

3. The patching compound of claim 1 wherein the predominant functional groups in both the membrane copolymer and the patching copolymer are carbonyl types.

4. The patching compound of claim 1 wherein the functional groups in said patching fluorocarbon copolymer are predominantly carbonyl ester groups and said dispersion medium is predominantly Halocarbon Oil, perfluorooctanoic acid, perfluorodecanoic acid or mixtures thereof.

5. The patching compound of claim 1 wherein the functional groups in said patching fluorocarbon copolymer are predominantly metal, ammonium or amine salts of carboxylate functional groups and said dispersion medium is predominantly N-butylacetamide.

6. The patching compound of claim 1 wherein the functional groups in said patching fluorocarbon copolymer are predominantly sulfonyl types.

7. The patching compound of claim 1 wherein the functional groups in said patching fluorocarbon copolymer are predominantly metal, ammonium or amine salts of sulphonate groups and said dispersion medium is predominantly tetrahydrothiophene-1,1-dioxide.

* * * * *